US006990093B1

(12) United States Patent
Rantalainen et al.

(10) Patent No.: US 6,990,093 B1
(45) Date of Patent: Jan. 24, 2006

(54) METHOD OF TRANSMITTING SYNCHRONIZED CHANNEL IN RADIO TRANSMITTER

(75) Inventors: Timo Rantalainen, Helsinki (FI); Ville Ruutu, Espoo (FI); Marko A Alanen, Tampere (FI); Gudni Gunnarson, Espoo (FI); Olli Hyvarinen, Tampere (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/647,081

(22) PCT Filed: Mar. 25, 1999

(86) PCT No.: PCT/FI99/00247

§ 371 (c)(1),
(2), (4) Date: Nov. 13, 2000

(87) PCT Pub. No.: WO99/53640

PCT Pub. Date: Oct. 21, 1999

(30) Foreign Application Priority Data

Mar. 27, 1998 (FI) .................................. 980704

(51) Int. Cl.
*H04J 3/06* (2006.01)

(52) U.S. Cl. ................... 370/350; 370/468; 370/503; 455/456.5; 455/502; 342/386; 342/450

(58) Field of Classification Search ............... 370/350, 370/508, 324, 337, 347, 503, 507, 509, 510, 370/511, 513, 514, 516, 520, 342, 568, 335, 370/311, 328, 310, 338, 468; 375/149, 240.28, 375/295, 316, 363–366; 455/133, 456.1, 455/456.3, 456.6, 502, 456.5; 342/352.6, 342/386, 450
See application file for complete search history.

(56) References Cited

U.S. PATENT DOCUMENTS 4,397,019 A * 8/1983 Alvarez et al. ............. 370/324
5,390,216 A * 2/1995 Bilitza et al. ............... 375/354

(Continued)

FOREIGN PATENT DOCUMENTS

| EP | 661 836 | 7/1995 |
| EP | 740 431 | 10/1996 |
| EP | 767 594 | 4/1997 |

(Continued)

*Primary Examiner*—Dang Ton
*Assistant Examiner*—Inder Pal Mehra
(74) *Attorney, Agent, or Firm*—Pillsbury Winthrop Shaw Pittman LLP (57) ABSTRACT

The invention relates to a method of transmitting a synchronized channel in a radio transmitter and to a radio transmitter. The method comprises transmitting normal radio bursts on a normal channel asynchronously. In the invention, synchronized timing is obtained, synchronized radio bursts (SB) are formed, and a synchronized radio burst is transmitted in the place of a normal radio burst (NB). The length of the synchronized radio burst (SB) is at most half of the length of the normal radio burst (NB). The transmission of the synchronized radio burst (SB) is in synchronization with the obtained synchronized timing.

16 Claims, 5 Drawing Sheets

U.S. PATENT DOCUMENTS

| | | | |
|---|---|---|---|
| 5,533,028 A * | 7/1996 | Hita de la Torre et al. | 370/347 |
| 5,663,958 A | 9/1997 | Ward | |
| 5,711,003 A * | 1/1998 | Dupuy | 455/436 |
| 5,805,633 A * | 9/1998 | Uddenfeldt | 375/133 |
| 5,940,380 A * | 8/1999 | Poon et al. | 370/330 |
| 6,108,553 A * | 8/2000 | Silventoinen et al. | 455/456.3 |
| 6,108,555 A * | 8/2000 | Maloney et al. | 455/456.2 |
| 6,332,086 B2 * | 12/2001 | Avis | 455/574 |
| 6,707,807 B1 * | 3/2004 | Menzel | 370/337 |

FOREIGN PATENT DOCUMENTS

| | | |
|---|---|---|
| GB | 2 305 824 | 4/1997 |
| WO | WO 97/31433 | 8/1997 |

* cited by examiner

METHOD OF TRANSMITTING SYNCHRONIZED CHANNEL IN RADIO TRANSMITTER

This application is the national phase of international application PCT/F199/00247 filed Mar. 25, 1999 which designated the U.S.

FIELD OF THE INVENTION

The invention relates to a method of transmitting a synchronized channel in a radio transmitter, where normal radio bursts are transmitted on a normal channel asynchronously.

BACKGROUND OF THE INVENTION

Cellular radio networks comprise applications which require that a subscriber terminal or some other corresponding radio receiver receives synchronized radio signals from various base stations. Such applications include different methods of locating subscriber terminals. An example of such locating methods is an OTD (Observed Time Difference) method based on time differences detected in the reception of signals. In this method a terminal equipment measures differences in times of arrivals of signals transmitted by base stations. The method requires that the base stations transmit signals at the same moment, in other words synchronously, or otherwise data is required on the differences in synchronization (Real Time Difference, RTD) between the base stations if the base stations are not synchronized. The location is carried out based on this data. This method is described in greater detail in Finnish Patent Application 954,705.

Several systems, such as the GSM system, are not synchronized or they are not synchronized sufficiently accurately so that the signals could be used in the location according to the OTD method. In the GSM system, normal channels are divided both on a time division (TDMA, time division multiple access) and frequency division (FDMA, frequency division multiple access) basis. A radio transmitter thus uses a specific time slot on a predetermined frequency for transmitting a normal physical channel. In the GSM system, the base stations transmit radio bursts of a normal channel asynchronously, which means that the transmissions between the base stations are not coordinated such that each base station would transmit a radio burst simultaneously. Further, the aforementioned synchronization differences between the base stations change over time. Therefore the OTD method cannot be used for location without continuous measurement of the synchronization differences. Measurement of the synchronization differences produces more signalling and causes additional error in the accuracy of the location.

One suggested solution is to synchronize all the radio transmitters with each other by means of a satellite-based locating system (global positioning system, GPS), in which case a GPS receiver would be installed at each base station. This arrangement may cause problems in the GSM system since the system utilizes hierarchical clocks. This means that a base station controller guiding a base station obtains timing from higher network elements and delivers it to the base stations. If a GPS receiver were used for the timing of the base station transmission, the entire timing of the GSM system would be confused.

BRIEF DESCRIPTION OF THE INVENTION

An object of the invention is to develop a method and an apparatus implementing the method which solve the aforementioned problems. This is achieved with a method of the type described in the introduction, which is characterized by obtaining synchronized timing; forming synchronized radio bursts, the length of which is at most half of the length of a normal radio burst; transmitting a synchronized radio burst in the place of a normal radio burst such that the transmission of the synchronized radio burst is synchronized with the obtained synchronized timing.

The invention also relates to a radio transmitter comprising a channel codec for forming a normal channel; a burst former for forming normal radio bursts; a multiplexer for assigning to each burst the moment for its transmission.

The radio transmitter according to the invention is characterized in that it also comprises a clock for obtaining synchronized timing; the channel codec is arranged to form a synchronized channel; the burst former is arranged to form synchronized radio bursts, the length of which is at most half of the length of a normal radio burst; the multiplexer is arranged to insert a synchronized radio burst in the place of a normal radio burst such that the transmission of the synchronized radio burst is synchronized with the obtained synchronized timing.

The preferred embodiments of the invention are disclosed in the dependent claims.

A basic idea of the invention is that a radio burst normally used by a radio transmitter is at least halved so that the obtained synchronized radio burst can always be inserted flexibly in the place of the normal radio burst. The expression in the place of means that the normal radio burst is replaced in principle, i.e. the burst that is to be actually transmitted is not necessarily replaced but the synchronized burst is transmitted during the time slot in which it would be possible in principle to transmit the normal radio burst.

The method and the radio transmitter according to the invention provide several advantages. Synchronized signals can be transmitted to a receiver without a need to make any changes in the general timing structure. For example the GSM system does not require changes in the TDMA frame structure. The structure of the synchronized signals can be optimized according to the needs of the intended use, such as a locating method.

BRIEF DESCRIPTION OF THE FIGURES

In the following the invention will be described in greater detail in connection with preferred embodiments, with reference to the accompanying drawings, in which.

DETAILED DESCRIPTION OF THE INVENTION

Figure 1:
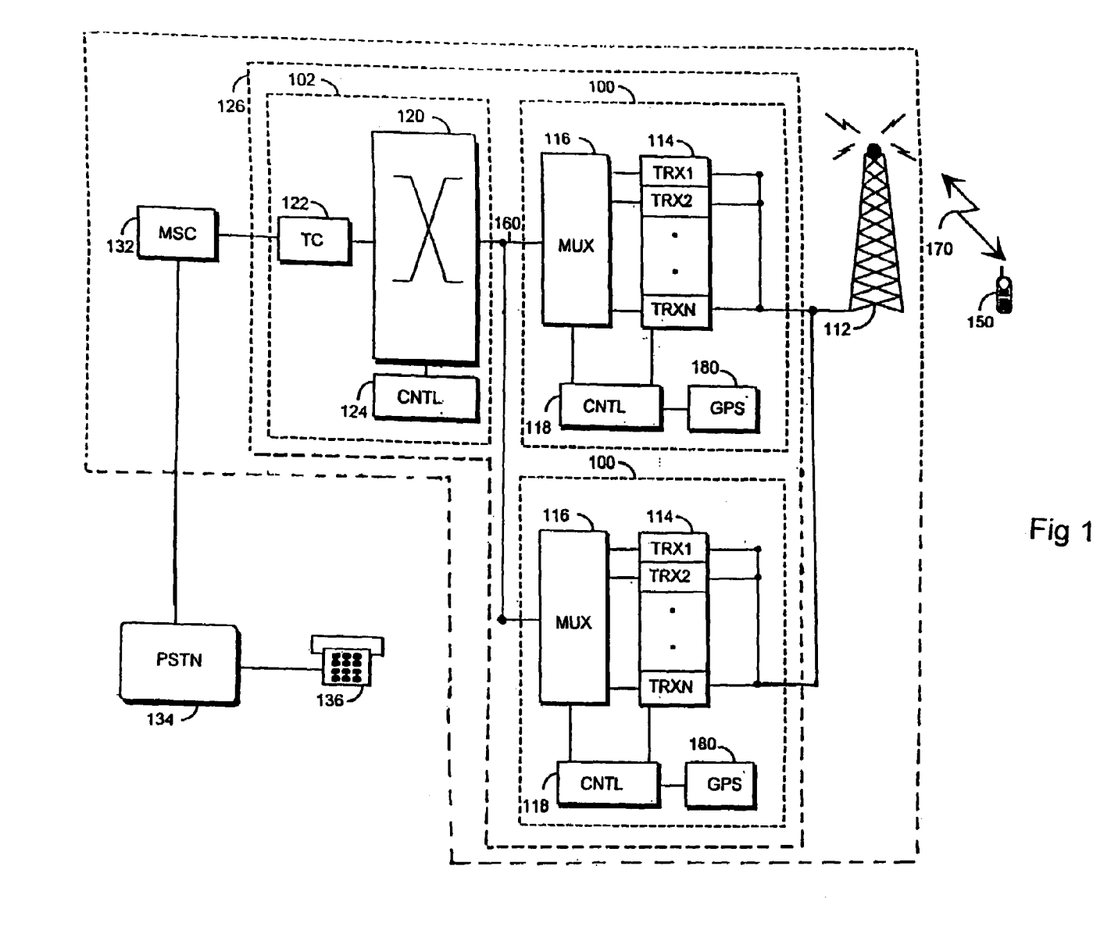
FIG. 1 shows an example of the structure of a cellular radio network employing the invention.

The invention can be used in different radio transmitters. The examples describe the use of the invention in a cellular radio network. With reference to FIG. 1, the structure of a typical cellular radio network will be described. FIG. 1 only contains the blocks that are essential for explaining the invention, but it is clear for those skilled in the art that a conventional cellular radio network also comprises other functions and structures, which do not have to be described in greater detail herein. The examples describe a cellular radio network employing time division multiple access (TDMA) without restricting the invention thereto, however.

A cellular radio network typically comprises a fixed network infrastructure, i.e. a network part 128, and subscriber terminals 150, which may be fixed, located in a vehicle or portable hand-held terminal equipments. The network part 128 comprises base stations 100. Several base stations 100 are controlled in a centralized manner by a base station controller 102 communicating with them. A base station 100 comprises transceivers 114. A base station 100 typically comprises 1 to 16 transceivers 114. For example in the TDMA radio system, one transceiver 114 typically provides radio capacity for one TDMA frame, i.e. eight time slots.

The base station 100 comprises a control unit 118, which controls the operation of the transceivers 114 and a multiplexer 116. The multiplexer 116 places the traffic and control channels used by several transceivers 114 onto a single transmission link 160.

The transceivers 114 of the base station 100 have a connection to an antenna unit 112, which realizes a bidirectional radio link 170 to a subscriber terminal 150. The structure of frames to be transmitted on the bidirectional radio link 170 is accurately determined and it is referred to as an air interface.

Figure 2:
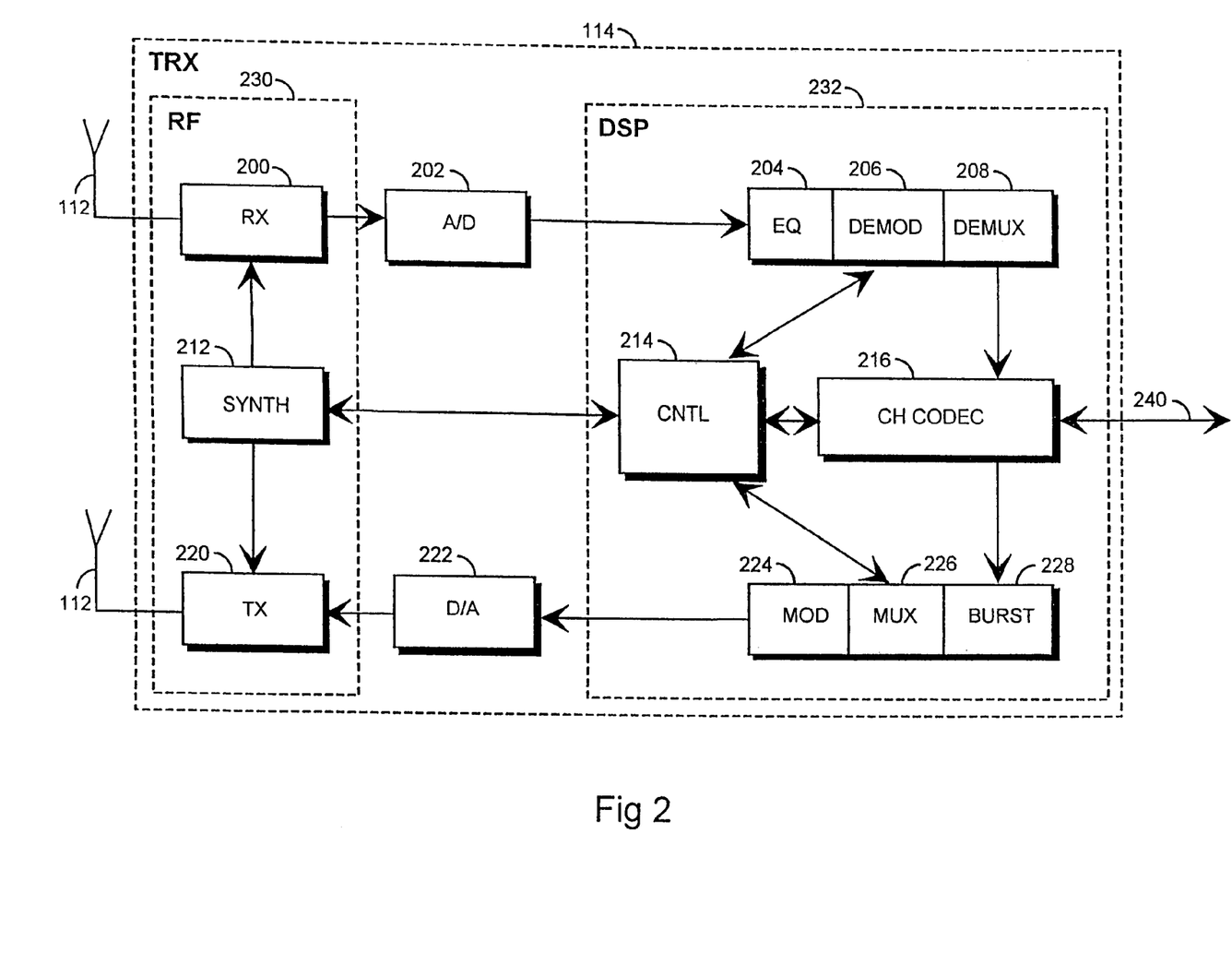
FIG. 2 shows the structure of a transceiver.

FIG. 2 shows in greater detail the structure of a transceiver 114. The functions at the reception will be described first. A receiver 200 comprises a filter blocking frequencies outside a desired frequency band. A signal is thereafter converted onto an intermediate frequency or directly to baseband, and the signal in this form is sampled and quantized in an A/D converter 202.

An equalizer 204 compensates for interference caused by multipath propagation, for example. A demodulator 206 extracts from the equalized signal a bit stream, which is transferred to a demultiplexer 208. The demultiplexer 208 separates the desired part from the received bit stream into logical channels. This function is based on the structure of the received bit stream, which consists of radio bursts placed in time slots, forming a physical channel.

A channel codec 216 decodes bit streams of different logical channels, i.e. it decides whether a bit stream consists of signalling data, which is transmitted to a control unit 214, or speech, which is transmitted 240 to a speech codec 122 in the base station controller 102. The channel codec 216 decodes possible channel coding, such as block coding and convolutional coding, deinterleaves possible interleaving, and decrypts the encryption used over the radio path.

The control unit 214 carries out internal control tasks by controlling different units mainly on the basis of control received from the base station controller 102.

The functions at the transmission will be described next. The data to be transmitted is channel-coded, interleaved and encrypted in the channel codec 216. A burst former 228 adds a training sequence and a tail to the data arriving from the channel codec 216. A multiplexer 226 assigns to each burst its physical channel. A modulator 224 modulates digital signals onto a radio frequency carrier. This function is analogous, wherefore it requires a D/A converter 222.

A transmitter 220 comprises a filter restricting the bandwidth. The transmitter 220 also controls the output power of the transmission. A synthesizer 212 provides different units with required frequencies. The synthesizer 212 comprises a clock, which may be locally controlled or controlled in a centralized manner from some other place, for example the base station controller 102. The synthesizer 212 creates the necessary frequencies by means of a voltage-controlled oscillator, for example.

As shown in FIG. 2, the structure of the transceiver can further be divided into radio-frequency parts 230 and a digital signal processor with its software 232. The radio-frequency parts 230 comprise the receiver 200, the transmitter 220 and the synthesizer 212. The digital signal processor with its software 232 comprises the equalizer 204, the demodulator 206, the demultiplexer 208, the channel codec 216, the control unit 214, the burst former 228, the multiplexer 226 and the modulator 224. Conversion of an analogue radio signal into a digital signal requires an A/D converter 202 and, correspondingly, the conversion of a digital signal into an analogue signal requires a D/A converter 222.

The base station controller 102 comprises a group switching field 120 and a control unit 124. The group switching field 120 is used for switching speech and data and for connecting signalling circuits. The base stations 100 and the base station controller 102 form a base station system 126, which also comprises a transcoder 122. The distribution of functions between the base station controller 102 and the base station stations 100 as well as their physical structure may vary in different implementations. The base stations 100 typically manage the implementation of the radio path as described above. The base station controller 102 typically manages the following things: configuration of traffic channels, frequency hopping control, paging of subscriber terminals, power control, quality control of active channels, and handover control.

The transcoder 122 is usually located as close to a mobile services switching centre 132 as possible, because this allows speech to be transmitted between the transcoder 122 and the base station controller 102 in a cellular radio network form, which saves transmission capacity. The transcoder 122 converts different digital speech coding modes used between a public switched telephone network and a radio phone network to make them compatible, for example from a 64 kbit/s fixed network form to another form (such as 13 kbit/s) of the cellular radio network, and vice versa. The control unit 124 performs call control, mobility management, gathering of statistical data, and signalling.

As shown in FIG. 1, a circuit-switched connection can be set up from the subscriber terminal 150 to a telephone 136 connected to the public switched telephone network (PSTN) 134 via the mobile services switching centre 132. The cellular radio network may also employ a packet-switched connection, for example 2+phase packet transmission, i.e. GPRS (General Packet Radio Service), of the GSM system.

The structure of the subscriber terminal 150 can be described by means of the representation of the structure of the transceiver 114 shown in FIG. 2. The structural elements of the subscriber terminal 150 are functionally identical to those of the transceiver 114. The subscriber terminal 150 also comprises a duplex filter between the antenna 112 and the receiver 200 and the antenna and the transmitter 220, user interface parts and a speech codec. The speech codec is connected to the channel codec 216 via a bus 240.

Figure 3:
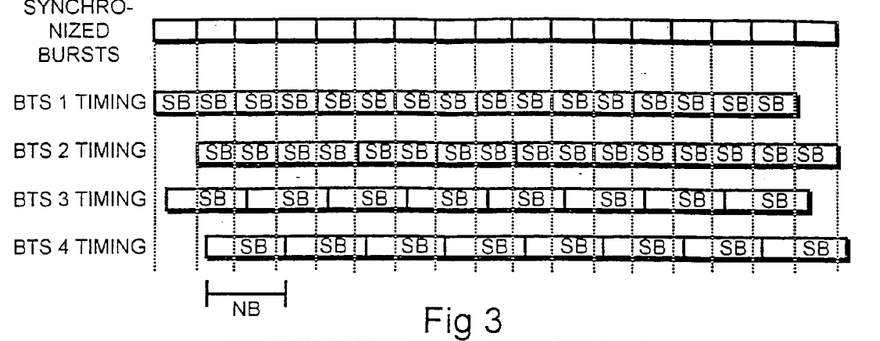
FIG. 3 shows synchronized radio bursts according to the invention and the moments when they are transmitted at four different base stations.

FIG. 3 shows how transmissions of four different base stations BTS 1, BTS 2, BTS 3, BTS 4 are not synchronized with each other. Each base station transmits its normal bursts NB at instants that differ randomly from one another. According to the invention, each base station receives timing, which is described in FIG. 3 by successive bursts SYNCHRONIZED BURSTS. Timing is received from a clock, which is for example a GPS receiver 180 connected to the control unit 118 of the base station 100 as shown in FIG. 1. The control unit 118 forwards the received timing to the transceivers 114.

In the invention, a special synchronous channel is formed in the channel codec 216. In principle the synchronous channel is placed on a normal physical channel. The number of physical channels available is a compromise. For example in the OTD locating method, the more frequently synchronous signals are transmitted the more often the subscriber terminal 150 is able to receive them and to carry out more measurements, which improves the accuracy of the location. On the other hand, this consumes more traffic capacity of the system. The example shown in FIG. 3 utilizes one frequency, i.e. all the eight time slots of one TDMA frame, i.e. eight physical traffic channels. If the traffic capacity is to be consumed as little as possible, only one time slot can be used to transmit synchronized bursts, for example time slot 'one' of a broadcast control channel (BCCH), in which case the subscriber terminal 150 always knows the location of the synchronized bursts after it has received one normal synchronization channel burst (SCH). In order that the capacity of an uplink physical channel corresponding to a downlink synchronized channel would not be wasted, the capacity can be used to forward signalling data, such as measurement results of the subscriber terminal 150, to the base station 100.

A preferred embodiment utilizes the normally unused capacity for transmission of synchronized radio bursts. For example when a radio transmitter is in a mode of discontinuous transmission (DTX) and no normal radio bursts are being transmitted, it is possible to transmit instead synchronized radio bursts, on the basis of which the subsicber terminal 150 is able to determine its location, for example.

Another method of making the operation more effective is to transmit synchronized radio bursts by means of only a part of the capacity of a physical channel. In such a situation the synchronous bursts are repeated according to a predetermined sequence, for example in every third time slot of the physical channel.

The physical channel to be used for transmitting the synchronized channel can be indicated to the subscriber terminal 150 on a control channel, such as the broadcast control channel (BCCH).

The burst former 228 is arranged to form synchronized radio bursts SB. The length of a synchronized radio burst SB is at most half of the length of a normal burst NB in order that the synchronized burst SB can always be inserted in the place of the normal burst NB. The multiplexer 226 is arranged to insert the synchronized radio burst SB in the place of the normal radio burst NB in such a way that the transmission of the synchronized burst SB is synchronized with the timing obtained from the clock 180.

FIG. 3 shows timing in the form of possible synchronized bursts SYNCHRONIZED BURSTS. A vertical line has been drawn from the start and end of each such burst to describe the instant a synchronous burst SB can be transmitted at each base station BTS 1 TIMING, BTS 2 TIMING, BTS 3 TIMING, BTS 4 TIMING. The synchronized bursts SB transmitted by each base station start and end at exactly the same instant.

It can be seen from FIG. 3 that in a preferred embodiment the timings happen to match at base station BTS 1, whereupon two synchronized bursts SB can be transmitted in the place of a normal burst NB. The burst former 228 is arranged to form successive synchronized bursts SB, which the multiplexer 226 inserts in the place of the normal burst NB since they fit there. On the other hand, this embodiment can also be avoided if receiving two synchronized bursts during one time slot causes problems in the subscriber terminal 150, in which case only one of the synchronized bursts is transmitted.

At base station BTS 2, the timings differ from one another exactly half a time slot, and therefore it is possible to transmit two synchronized bursts SB in the place of the normal burst NB.

However, in the most common situation the timing obtained by the base station 100 from the network and the timing obtained from the clock 180 do not match. In such a case it is possible to transmit only one synchronized burst SB in the place of the normal burst NB as shown in FIG. 3 with base stations BTS 3 and BTS 4. As the figure shows, every other synchronous burst SB would extend to two normal bursts NB, which is not desirable.

Figure 5:
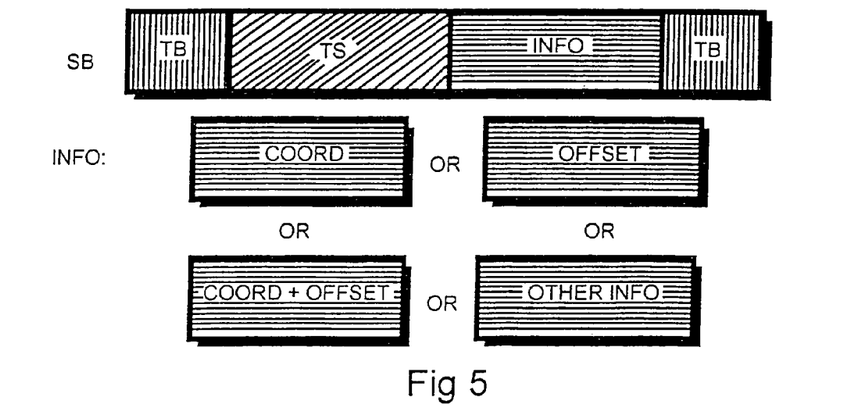
FIG. 5 shows the structure of a synchronized radio burst.

FIG. 5 illustrates the structure of a synchronized burst SB. In the same way as a normal burst a synchronized burst must also comprise tail bits TB both at the beginning and end of the burst. These bits are used during a guard period when the transmitter increases the power to the required transmit power and thereafter lowers it to the idle state. The tail bits are usually set to zero.

Figure 4:
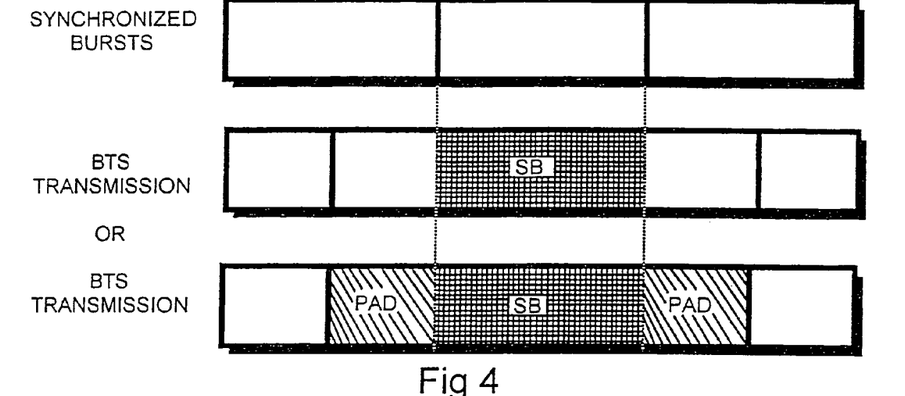
FIG. 4 shows two different alternatives of transmitting a synchronized radio burst in the place of a normal radio burst.

As shown in FIG. 4, a synchronized burst SB can be inserted in the place of a normal burst NB in two different manners. The first manner is shown in the middle in the figure. The synchronized burst SB shown therein is a special burst of FIG. 5, the length of which is at most half of the normal burst NB. Nothing else is transmitted in this time slot besides the synchronized burst SB.

The second manner is illustrated in FIG. 4 at the bottom. The burst former 228 is arranged to form a burst that is equal in length to a normal radio burst NB, and a synchronized burst SB is inserted therein. The part of the formed burst that does not belong to the synchronized burst SB is filled with predetermined padding bits PAD. This embodiment provides an advantage that the transmission time of the burst does not have to be changed, but only the content thereof is altered.

As shown in FIG. 5, the synchronized burst SB comprises at least a predetermined bit pattern TS. Usually this bit pattern is a training sequence which is also known to the receiver and which can be searched in the equalizer 204. By comparing this known training sequence to the signal that is actually received it is possible to estimate what kind of distortions have accumulated in the signal over the radio path. When the receiver receives the synchronized burst SB it also obtains accurate timing, since the transmission moment of the burst is determined to be the same at different base stations, unlike in the case of normal bursts NB. For the purpose of locating methods the structure of a known bit pattern can be optimized suitably.

In a preferred embodiment a synchronized burst also comprises other information INFO as shown in FIG. 5. The information may contain the location coordinates COORD of the base station 100. Timing offset OFFSET can also be transmitted in the information field INFO. In this case the offset refers to the time difference between the transmission moments of the ideal synchronized radio burst and the actual synchronized radio burst. In reality, the transmission moment of the synchronized burst SB can be adjusted with the accuracy of maybe only one bit or one fourth of a bit, in which case the offset indicates the difference from the exact correct transmission moment. The information may further include other information OTHER INFO, and the information can also be combined COORD+OFFSET in a desired manner.

To obtain the most accurate possible timing the training sequence TS should be as long as possible. Therefore some or even all of the information INFO can be transferred to padding bits PAD, so that the training sequence TS can be continued to the place of the information INFO. Since the position of the synchronized burst SB varies, sometimes the information INFO would be placed before and sometimes after the synchronized burst SB. In such a case the subscriber terminal 150 must be able to select the correct place from which the information INFO is decoded.

Figure 8:
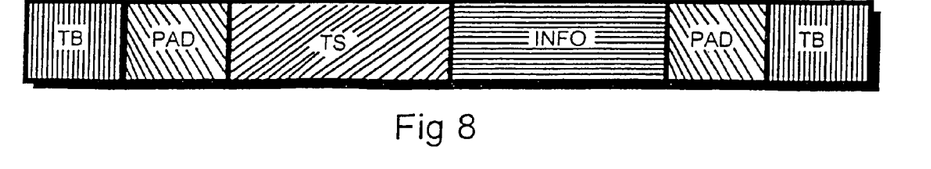
FIG. 8 shows the positioning of a synchronized radio burst with padding bits in the place of a normal radio burst.

FIG. 8 shows how a synchronized radio burst SB is inserted with padding bits PAD in the place of a normal radio burst NB. This figure illustrates the implementation of the alternative shown lowermost in FIG. 4. The tail bits TB are naturally situated at the beginning and end of the burst. They are followed by padding bits PAD, which surround the training sequence TS and the information INFO.

The invention is preferably implemented by means of software and it requires changes in an accurately restricted area of the software of the digital signal processor 232 in the transceiver 114 of the base station 100. The invention further requires that a radio transmitter obtains synchronized timing for example from the clock 180.

Figure 6:
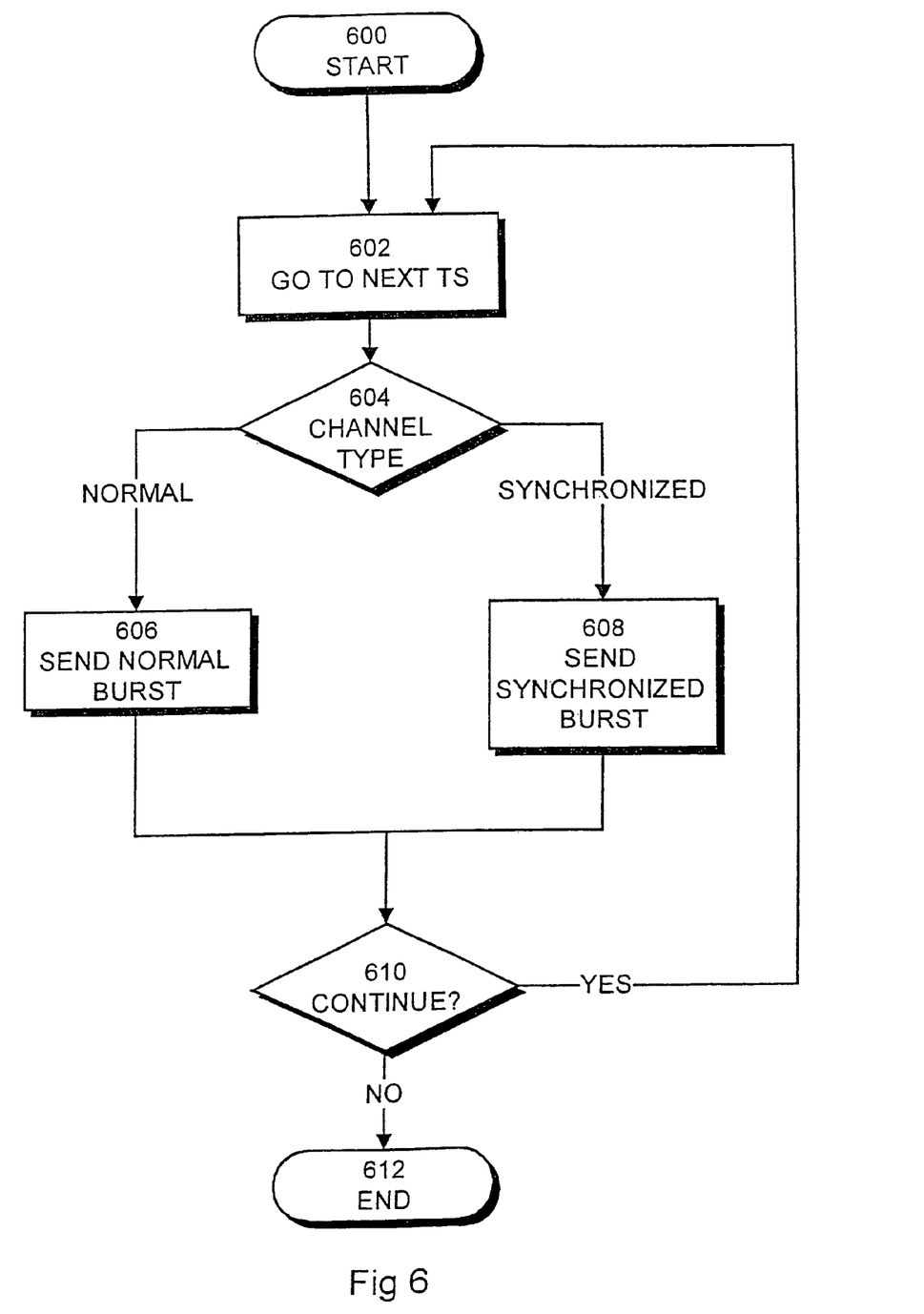
FIGS. 6 and 7 are flowcharts illustrating the implementation of the method according to the invention.

The implementation of the method according to the invention in a radio transmitter is further illustrated with reference to the flowcharts of FIGS. 6 and 7. The method starts in block 600. In block 602 the method proceeds to the next time slot. In block 604 it is checked whether the logical channel to be transmitted in the time slot is normal or synchronized. In block 606 normal radio bursts are transmitted asynchronously on a normal channel. In block 608, a synchronized burst formed according to the invention is transmitted. In block 610 it is checked whether the method is to be continued. If not, the execution of the method is terminated in block 612. If it is continued, the process proceeds to block 602, where the processing of the next time slot is started.

Figure 7:
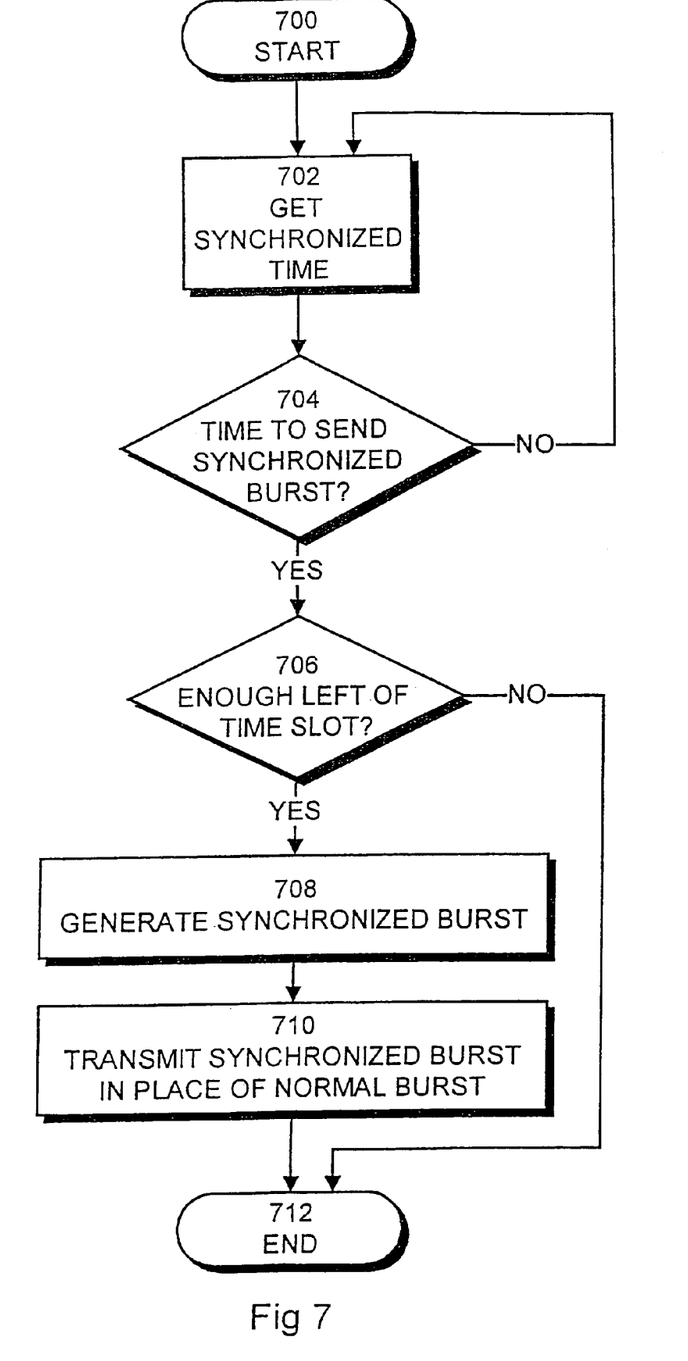

Block 608 is described in greater detail in FIG. 7. The implementation begins in block 700. Synchronized timing is obtained in block 702. Next, it is checked in block 704 whether it is time to transmit a synchronized burst. If not, the process moves back to block 702 where the clock is checked. This is repeated until it is time to transmit the synchronized burst. When it is detected after the checking carried out in block 704 that it is time to transmit a synchronized burst, the method proceeds to block 706. In block 706 it is checked whether a sufficient part of the time slot is left for the transmission of the synchronized burst. If not, the method proceeds to block 712. If a sufficient part of the time slot is left, the process moves to block 708 where synchronized radio bursts SB are formed, the bursts having a length of at most half of the length of a normal radio burst. Next, in block 710 the synchronized radio burst is transmitted in the place of a normal radio burst such that the transmission of the synchronized burst is synchronized with the obtained synchronized timing. The last step is block 712 where the execution of block 608 is terminated.

Even though the invention is described above with reference to the example according to the accompanying drawings, it is clear that the invention is not restricted thereto but it can be modified in several ways within the scope of the inventive idea disclosed in the appended claims.

What is claimed is:

1. A radio transmitter comprising:
 a channel codec configured to form a normal channel;
 a burst former configured to form normal radio bursts;
 a multiplexer configured to assign to each radio burst a moment for its transmission; and
 a clock configured to obtain synchronized timing, which synchronized timing defines the coordination between the transmission of radio bursts from at least two different base stations each including at least one radio transmitter;
 wherein the burst former is arranged to form synchronized radio bursts, a length of each of the synchronized radio bursts is at most half of a length of a normal radio burst, and the multiplexer is arranged to insert a synchronized radio burst in place of the normal radio burst such that transmission of the synchronized radio burst is synchronized with the obtained synchronized timing.

2. The radio transmitter according to claim 1, wherein the burst former is arranged to form at least two successive synchronous radio bursts and the multiplexer is arranged to insert at least one of the at least two successive synchronous radio bursts in place of the normal radio burst.

3. The radio transmitter according to claim 1, wherein the burst former is arranged to form a burst having a length equal to a length of the normal radio burst, said burst comprising at least one synchronized radio burst.

4. The radio transmitter according to claim 3, wherein the burst former is configured to place predetermined padding bits in a part of the burst that does not belong to the synchronized radio burst.

5. The radio transmitter according to claim 1, wherein the burst former is configured to place a predetermined bit pattern in the synchronized radio burst.

6. The radio transmitter according to claim 5, wherein the predetermined bit pattern is a training sequence.

7. The radio transmitter according to claim 1, wherein the channel codec is arranged to place in the synchronized radio burst information including at least one of the location coordinates of the radio transmitter and an offset.

8. The radio transmitter according to claim 7, wherein the offset is the time difference between transmission moments of an ideal synchronized radio burst and an actual synchronous radio burst.

9. The radio transmitter according to claim 1, wherein the multiplexer is arranged to place the synchronized radio burst in a time slot.

10. The radio transmitter according to claim 1, wherein the channel codec is configured to use at least one normal physical channel for the synchronized channel.

11. The radio transmitter according to claim 10, wherein the radio transmitter is configured to indicate on a control channel physical channels to be used for the transmission of the synchronized channel.

12. A The radio transmitter according to claim 1, wherein the radio transmitter is arranged to receive signaling data from channels in a direction of reception corresponding to synchronized channels in a direction of transmission.

13. The radio transmitter according to claim 1, wherein the clock is a GPS receiver.

14. The radio transmitter according to claim 1, wherein the radio transmitter is arranged to transmit a synchronized radio burst when the transmitter is in discontinuous transmission.

15. The radio transmitter according to claim 1, wherein the radio transmitter is arranged to use only a part of a capacity of a normal channel for transmission of synchronized radio bursts.

16. The radio transmitter according to claim 1, wherein the channel codec is arranged to further form a synchronized channel.

* * * * *